(12) United States Patent
Burr et al.

(10) Patent No.: US 10,305,195 B2
(45) Date of Patent: May 28, 2019

(54) IMAGING ARRAY FED REFLECTOR

(71) Applicant: Space Systems/Loral, LLC, Palo Alto, CA (US)

(72) Inventors: Douglas G. Burr, San Jose, CA (US); Seyed A. Tabatabaei, Mountain View, CA (US); James J. Sowers, Sunnyvale, CA (US); Walter S. Gelon, Redwood City, CA (US); Peter S. Simon, Camarillo, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 208 days.

(21) Appl. No.: 15/438,620

(22) Filed: Feb. 21, 2017

(65) Prior Publication Data
US 2018/0013204 A1 Jan. 11, 2018

Related U.S. Application Data

(60) Provisional application No. 62/360,840, filed on Jul. 11, 2016.

(51) Int. Cl.
*H04B 7/204* (2006.01)
*H01Q 1/28* (2006.01)
(Continued)

(52) U.S. Cl.
CPC ............ *H01Q 15/14* (2013.01); *H01Q 1/28* (2013.01); *H01Q 1/288* (2013.01); *H01Q 19/10* (2013.01);
(Continued)

(58) Field of Classification Search
None
See application file for complete search history.

(56) References Cited

U.S. PATENT DOCUMENTS

| 3,936,835 A | 2/1976 | Phelan |
| 4,236,161 A | 11/1980 | Ohm |

(Continued)

FOREIGN PATENT DOCUMENTS

| EP | 1 020 950 A2 | 7/2000 |
| WO | WO 01/18912 A1 | 3/2001 |
| WO | WO 2016/094786 A1 | 6/2016 |

OTHER PUBLICATIONS

Extended European Search Report dated Dec. 7, 2017 issued in 17176140.6.

*Primary Examiner* — Ricardo I Magallanes
(74) *Attorney, Agent, or Firm* — Weaver Austin Villeneuve & Sampson LLP

(57) ABSTRACT

An imaging array fed reflector for a spacecraft is included in a spacecraft payload subsystem. The payload subsystem includes a multi-beam antenna including a reflector, a plurality of amplifiers, and a plurality of radiating feed elements, the feed elements configured as a phased array, illuminating the reflector, operable at a frequency having a characteristic wavelength ($\lambda$), and configured to produce, in a far field at the reflector, a set of contiguous abutting beams. The amplifiers are disposed proximate to the plurality of radiating feed elements. Each radiating feed element has a respective coupling with at least one respective amplifier of the plurality of amplifiers. Each radiating feed element, together with the at least one respective amplifier, is disposed in a closely packed triangular lattice such that separation between adjacent radiating feed elements is not greater than $1.5\lambda$.

18 Claims, 11 Drawing Sheets

(51) Int. Cl.
   *H01Q 15/14*    (2006.01)
   *H01Q 19/10*    (2006.01)
   *H01Q 19/17*    (2006.01)
   *H01Q 21/06*    (2006.01)
   *H01Q 21/22*    (2006.01)
   *H01Q 25/00*    (2006.01)

(52) U.S. Cl.
   CPC ........... *H01Q 19/17* (2013.01); *H01Q 21/064* (2013.01); *H01Q 21/22* (2013.01); *H01Q 25/007* (2013.01); *H04B 7/2041* (2013.01)

(56) References Cited

U.S. PATENT DOCUMENTS

| | | | |
|---|---|---|---|
| 5,936,588 | A | 8/1999 | Rao et al. |
| 5,936,592 | A | 8/1999 | Ramanujam et al. |
| 6,842,157 | B2 | 1/2005 | Phelan et al. |
| 9,153,877 | B2 | 10/2015 | Burr |
| 2003/0076274 | A1* | 4/2003 | Phelan .................. H01Q 3/26 343/895 |
| 2007/0018900 | A1* | 1/2007 | Rao ..................... H01Q 19/17 343/779 |
| 2009/0262037 | A1* | 10/2009 | Matyas ................ H01Q 19/12 343/779 |
| 2010/0309050 | A1 | 12/2010 | Raguenet |
| 2011/0109507 | A1 | 5/2011 | Warnick |
| 2011/0267251 | A1 | 11/2011 | Mathews et al. |
| 2015/0061930 | A1* | 3/2015 | Runyon ................ H01Q 3/30 342/354 |
| 2015/0295640 | A1 | 10/2015 | Burr |

* cited by examiner

IMAGING ARRAY FED REFLECTOR

CROSS-REFERENCE TO RELATED APPLICATIONS

This disclosure claims priority to U.S. Provisional Patent Application No. 62/360,840, filed Jul. 11, 2016, entitled "IMAGING ARRAY FED REFLECTOR," and assigned to the assignee hereof, the disclosure of which is hereby incorporated by reference in its entirety into this patent application for all purposes.

TECHNICAL FIELD

The present disclosure relates generally to satellite antennas, and particularly to an imaging array fed reflector for a high throughput satellite payload.

BACKGROUND OF THE INVENTION

The assignee of the present invention manufactures and deploys spacecraft for, inter alia, communications and broadcast services. Market demands for such spacecraft have imposed increasingly stringent requirements on spacecraft payloads. For example, broadband service providers desire spacecraft with increased data rate capacity at higher EIRP through each of an increased number of user spot beams operable from geosynchronous orbit altitudes in communication with small (<1 meter aperture) user terminals.

A multi-beam antenna (MBA) system generates a set of user spot beams that define a coverage area which may extend, in aggregate, across a large region on the ground. MBAs providing wide-band communications services from a geosynchronous satellite conventionally provide contiguous coverage of a region with a triangular lattice of overlapping circular antenna beams. These beams are conventionally formed using clusters of radiating elements configured as circular feed horns, also centered on a triangular lattice.

An objective of an MBA system is to maximize beam forming efficiency, measured as gain area product (GAP) of the MBA divided by $4\pi$ steradians (41,253 square degrees). $GAP=G_{ave}*A_{cov}$, where $G_{ave}$ is the average gain over coverage area, $A_{cov}$, with $A_{cov}$ expressed in square degrees. Known MBA systems provide a GAP of 10000-16000 and, therefore, a beam forming efficiency in the range of 24% to 39%. See: Han, C. C., et al., "Satellite Antennas", *Antenna Handbook*, volume 3, chapter 21, edited by Lo, Y. T., et al., ISBN 0-442-01594-1 (hereinafter, "Han"), the disclosure of which is hereby incorporated by reference.

In the absence of the presently disclosed techniques, a single aperture, array fed reflector MBA may share radiating elements between two or more beams, complicating the beamforming and requiring multi-carrier operation. Multi-carrier operation requires linearity which leads to output back-off of the amplifiers and reduced amplifier efficiency with increased power and heat generated for a given output power. Alternatively, an arrangement having a single feed horn per beam with a conventional multi-reflector MBA requires higher power amplifiers and amplifier redundancy, with increased cost and complexity. Moreover, an MBA having a single feed per beam is generally scan limited by reflector offset distortion.

Thus, an improved single aperture MBA design is desirable.

SUMMARY

The systems, methods and devices of this disclosure each have several innovative aspects, no single one of which is solely responsible for the desirable attributes disclosed herein.

In some implementations, a multi-beam antenna (MBA) system for a spacecraft includes a reflector, a plurality of radiating feed elements, configured as a phased array, illuminating the reflector, operable at a frequency having a characteristic wavelength ($\lambda$), and configured to produce, in a far field at the reflector, a set of contiguous abutting beams, and a plurality of amplifiers disposed proximate to the plurality of radiating feed elements. Each radiating feed element has a respective coupling with at least one respective amplifier of the plurality of amplifiers. Each radiating feed element, together with the at least one respective amplifier, is disposed in a closely packed triangular lattice such that separation between adjacent radiating feed elements is not greater than $2\lambda$.

In some examples, each of the radiating feed elements may be associated with only one of the contiguous abutting beams.

In some examples, each beam may be formed from a plurality of associated beamlets and each radiating feed element is associated with a single one of the plurality of associated beamlets.

In some examples, the respective coupling may be a coaxial connection.

In some examples, the at least one respective amplifier may include a first amplifier and a second amplifier, each amplifier corresponding to orthogonal polarizations.

In some examples, each radiating feed element may be associated with a respective beamlet, the respective beamlet having a beamlet width in the far field, the beamlet width being a function of the characteristic wavelength $\lambda$ and a diameter of the reflector; and the respective beamlet having a beamlet spacing in the far field, the spacing being a function of a spacing between radiating feed elements and a focal length of the reflector. In some examples, the reflector may be approximately 9 meters in diameter, and the beamlet width is approximately 0.1 degrees in a 20 GHz band. In some examples, the beamlet spacing may be approximately 0.07 degrees.

In some examples, for each beam in the set of contiguous abutting beams, a single carrier is operated.

In some examples, for each beam in the set of contiguous abutting beams, a set of amplifiers may be configured to provide soft redundancy.

In some examples, each radiating feed element may include an end-fired element. In some examples, the end-fired element may be configured as a helical, Yagi, crossed Yagi, log periodic, or a stacked patch antenna element.

In some examples, the at least one respective amplifier includes at least one main amplifier and at least one auxiliary amplifier. In some examples, the at least one main amplifier and at least one auxiliary amplifier may be arranged in a Doherty configuration.

In some implementations, a spacecraft includes a communications payload subsystem, the payload subsystem including a reflector, a plurality of radiating feed elements, configured as a phased array, illuminating the reflector, operable at a frequency having a characteristic wavelength ($\lambda$), and configured to produce, in a far field at the reflector, a set of contiguous abutting beams, and a plurality of amplifiers disposed proximate to the plurality of radiating feed elements. Each radiating feed element has a respective coupling with at least one respective amplifier of the plurality of amplifiers, and each radiating feed element, together with the at least one respective amplifier, is disposed in a closely packed triangular lattice such that separation between adjacent radiating feed elements is not greater than 2λ.

Figure 1A:
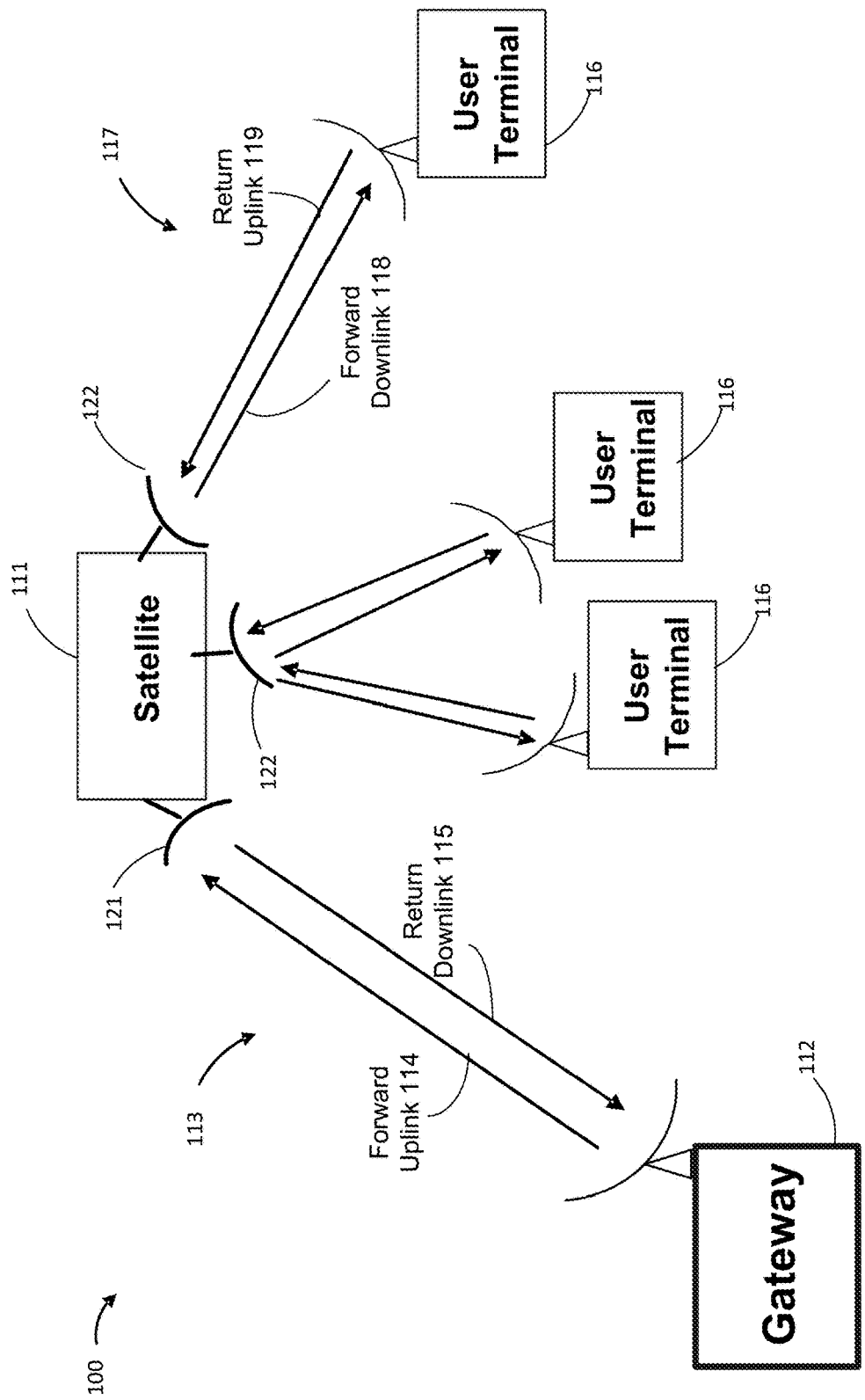
FIG. 1A illustrates a simplified diagram of a satellite communications network.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when a feature is referred to as being "connected" or "coupled" to another feature, it can be directly connected or coupled to the other feature, or intervening features may be present. Furthermore, "connected" or "coupled" as used herein may include wirelessly connected or coupled. It will be understood that although the terms "first" and "second" are used herein to describe various features, these features should not be limited by these terms. These terms are used only to distinguish one feature from another feature. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "/" is also used as a shorthand notation for "and/or".

The terms "spacecraft", "satellite" and "vehicle" may be used interchangeably herein, and generally refer to any orbiting satellite or spacecraft system.

Referring to FIG. 1A, a simplified diagram of a satellite communications network 100 is illustrated. The network includes a satellite 111, which may be located, for example, at a geostationary orbital location or in low earth orbit. Satellite 111 may be communicatively coupled, via at least one feeder link antenna 121, to at least one gateway 112 and, via at least one user link antenna 122 to a plurality of user terminals 116. The at least one gateway 112 may be coupled to a network such as, for example, the Internet. Each gateway 112 and the satellite 111 communicate over a feeder link 113, which has both a forward uplink 114 and a return downlink 115. User terminals 116 and the satellite 111 communicate over a user link 117 that has both a forward downlink 118 and a return uplink 119. User link 117 and the feeder link may operate in respective assigned frequency bands, referred to herein as the "user link band" and the "feeder link band."

One or more of the feeder link antenna 121 and the user link antenna 122 may include a high efficiency multi-beam antenna (MBA) system of the type disclosed in U.S. Pat. No. 9,153,877 assigned to the assignee of the present invention, the disclosure of which is hereby incorporated into the present application in its entirety. The antenna reflector may be substantially oversized with respect to a reflector conventionally sized to produce a circular beam that is 4-4.5 dB down at the edge of coverage.

Figure 1B:
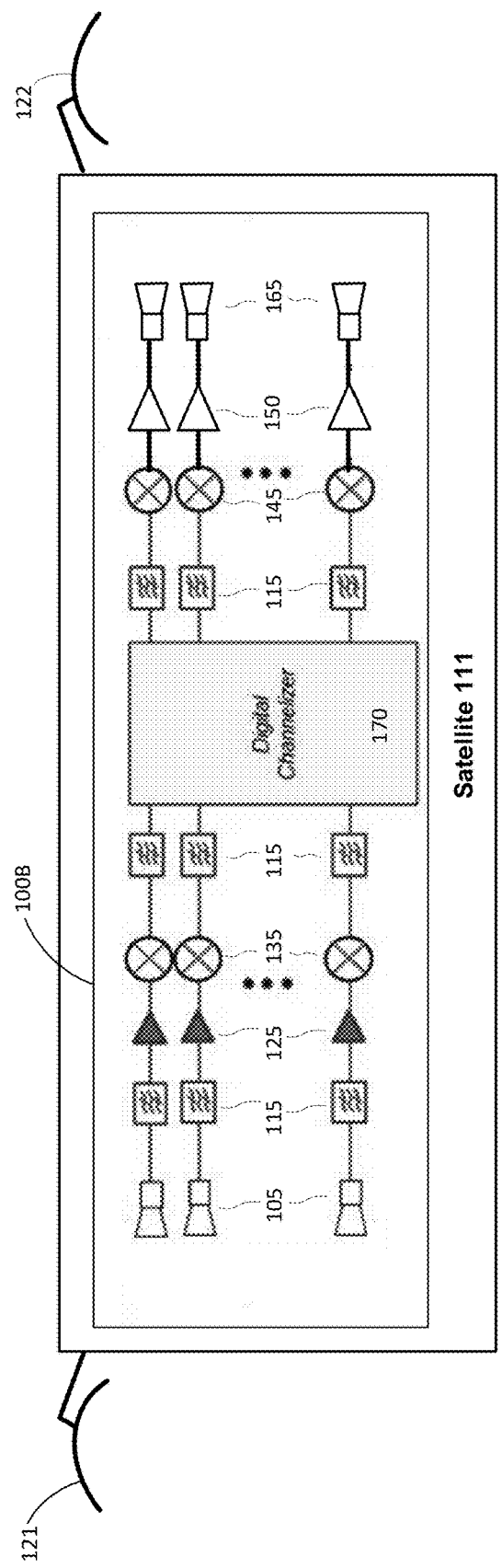
FIG. 1B illustrates a simplified block diagram of an example of a satellite payload subsystem.

Referring now to FIG. 1B, a simplified block diagram of a satellite payload subsystem 100B disposed within the satellite 111 is illustrated. The payload subsystem 100B may include receive antenna feeds 105 illuminated by feeder link antenna 121, filters 115, low-noise amplifiers (LNAs) 125, frequency converters, including input local oscillators 135, including output local oscillators 145, amplifiers 150, which may or may not include linearization, and radiating feed elements 165 that illuminate user link antenna 122. In some implementations, the user link antenna 122 may include a reflector.

In some implementations, the payload subsystem 100B may include a digital channelizer 170. The digital channelizer 170 may receive analog RF input signals by way of a quantity 'N' of receive ports, where 'N' is greater than or equal to 1. The digital channelizer 170 may enable the payload subsystem 100B to process multiple input signals and to reconfigurably distribute portions of those input signals into multiple output signals and to create reconfigurable channels to route the multiple input signals to multiple output ports. The digital channelizer 170 may include analog-to-digital converters, digital-to-analog converters, control computer(s) with software or firmware, and signal processing electronics (not illustrated). The digital channelizer 170 may forward analog RF output signals by way of a quantity 'M' of transmit ports, where 'M' is greater than or equal to 1. It will be appreciated that quantity 'M' is not necessarily equal to quantity 'N'. The multiple inputs and outputs provide redundancy for the payload 110, in addition to redundancy within the channelizer.

The digital channelizer 170 may be capable of operating over all or a substantial part of the bandwidth ranges that are allocated to the payload subsystem 100B. The digital channelizer 170 may sub-divide the uplink frequency spectrum into smaller segments and permit fine bandwidth adjustability in the smaller segments. The digital channelizer 170 may also tune, in fine or coarse increments, responsive to ground and/or onboard commands, the channel center frequency and bandwidth allocated to a particular uplink beam on a communications satellite, in addition to adjusting the frequency response curve and other characteristics of each channel. The digital channelizer 170 may directly handle uplink frequencies and/or downlink frequencies, thus, in some implementations, replacing some or all of the filters 115, the input frequency converters 135 and output frequency converters 145. Other functions of a digital channelizer may include frequency conversion, demodulation, bit detection, and modulation, among others.

It is contemplated that a spacecraft payload subsystem may be configured to include a digital channelizer as illustrated in FIG. 1B; however, in some implementations the payload subsystem may not include a digital channelizer.

Figure 2:
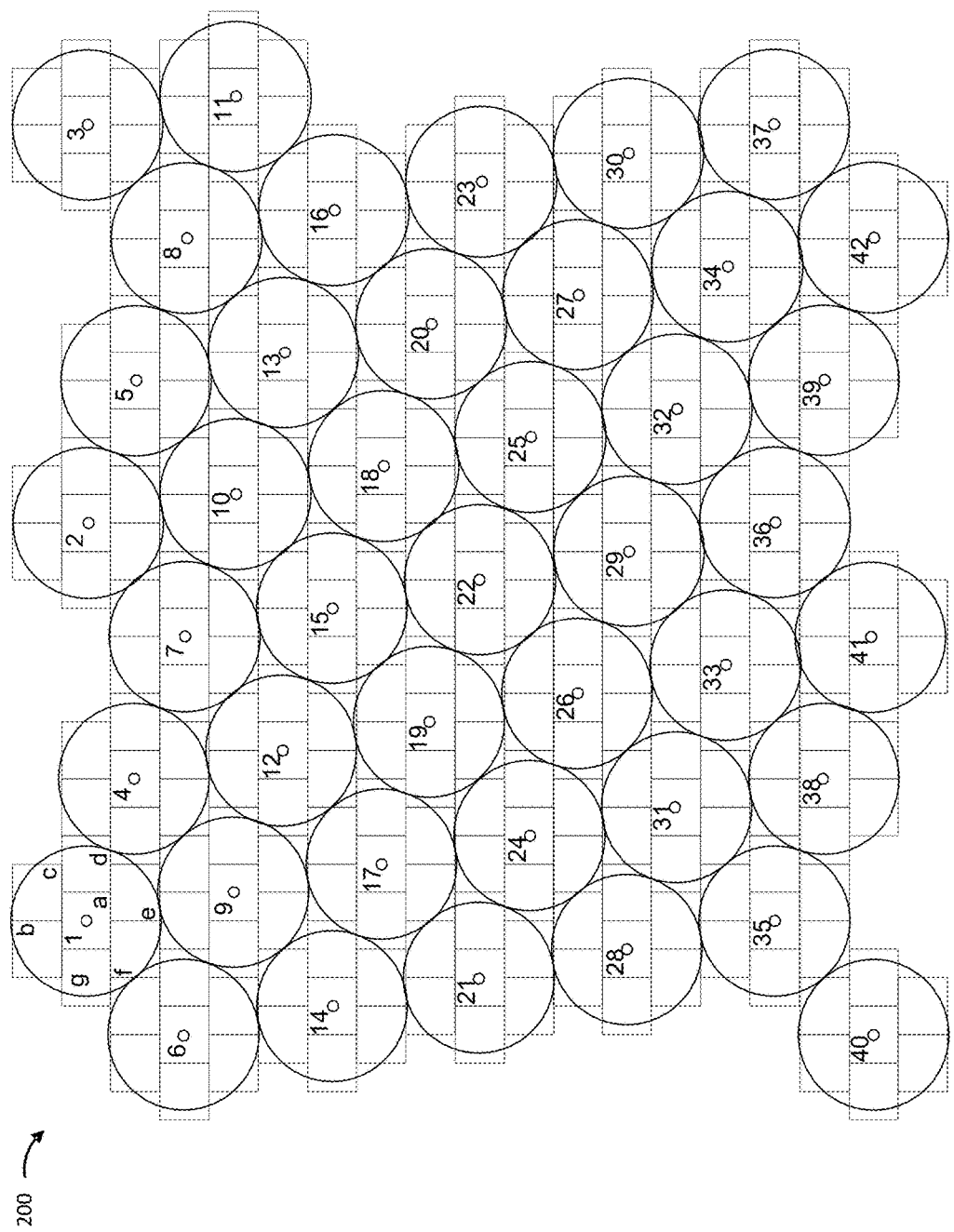
FIG. 2 illustrates an example of an active phased array for a MBA.

In some implementations, each of a large number of beams is formed by a respective dedicated cluster of elements with no element sharing between beams. FIG. 2 illustrates an example of an active phased array. In the illustrated implementation, an active phased array 200 is configured to provide forty-two beams, each beam formed by a cluster of seven dedicated radiating elements. For example, beam number 1 is illustrated to be formed by radiating elements located at positions a, b, c, d, e, f and g. It may be observed that each radiating element is associated with a single respective beam. In an implementation, each radiating element is coupled with a respective amplifier module disposed proximate to the radiating element. The beams are arranged in a close packed triangular lattice, likewise, the radiating elements are arranged in a close packed triangular lattice.

To facilitate the triangular lattice arrangement, each radiating element and a respective amplifier and related electronics may be arranged so as to be contained within a rectangular footprint area having an aspect ratio of short wall to long wall of $$\frac{\sqrt{3}}{2}:1.$$

Alternatively, each radiating element and a respective amplifier and related electronics may be arranged so as to be contained within a hexagonal footprint area. In either case, the footprint area is, advantageously, $$\frac{\sqrt{3}}{2}$$

times the spacing between adjacent elements ("element spacing") squared, in order to maximize packing efficiency. The element spacing may, advantageously, be small, for example less than 3λ. In an implementation, the element spacing is 1.1λ.

Figure 3:
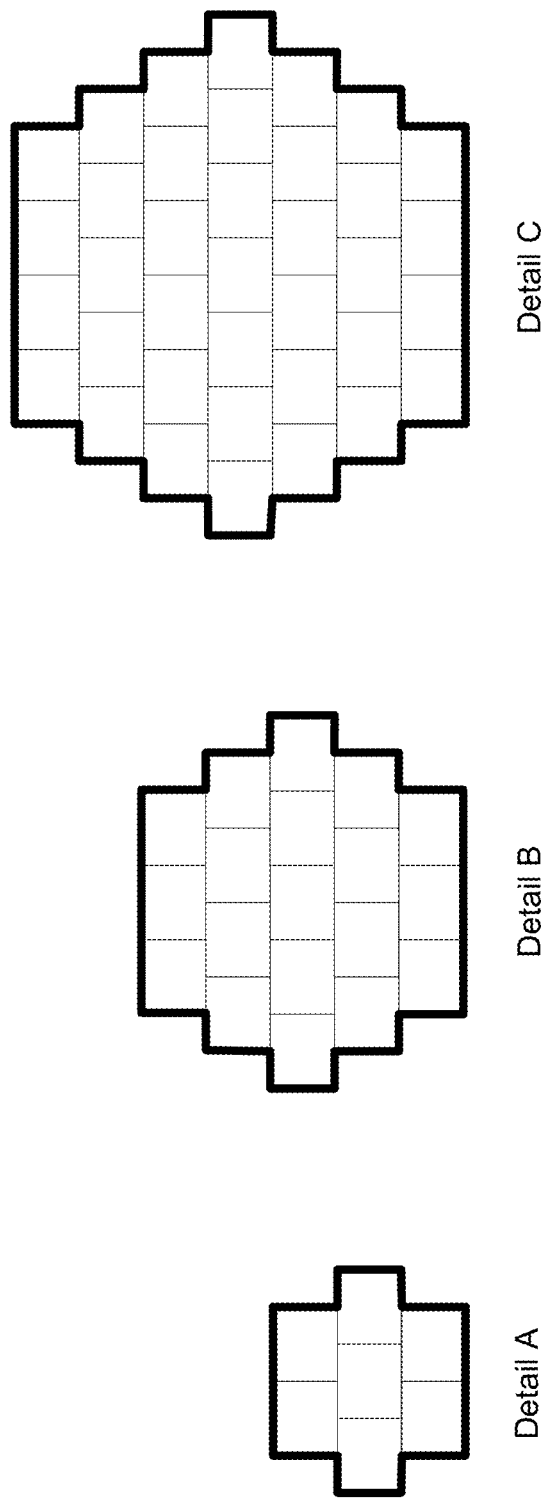
FIG. 3 illustrates a comparison of an arrangement for a beam being associated with seven radiating feed elements (Detail A) with an arrangement for a beam being associated with nineteen radiating feed elements (Detail B) and with an arrangement for a beams associated with thirty-seven radiating feed elements (Detail C).

In the arrangement illustrated in FIG. 2, each beam is associated with seven radiating feed elements. FIG. 3 illustrates a comparison of an arrangement for a beam being associated with seven radiating feed elements (Detail A) with an arrangement for a beam being associated with nineteen radiating feed elements (Detail B) and with an arrangement for a beams associated with thirty-seven radiating feed elements (Detail C).

Figure 4:
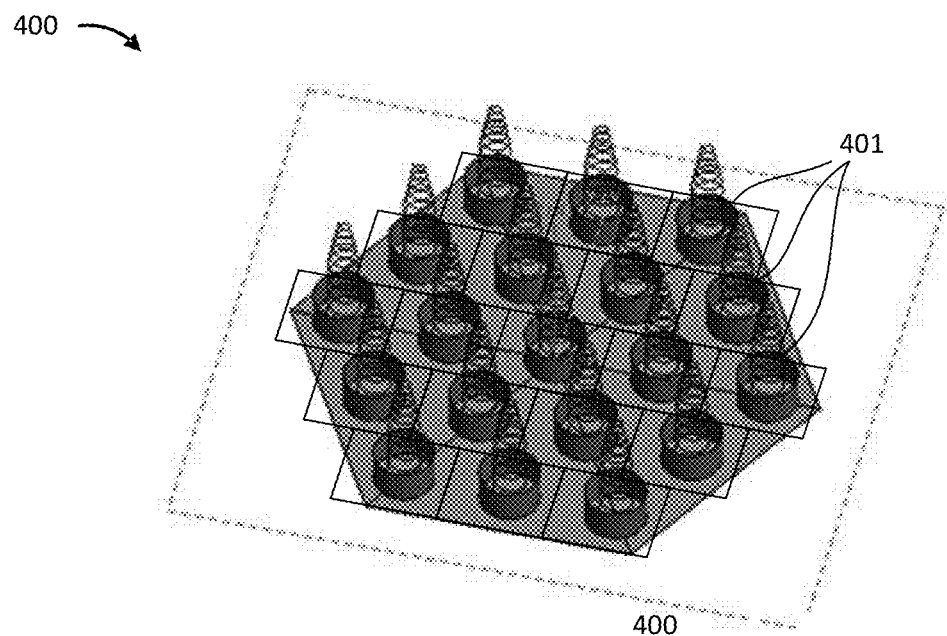
FIG. 4 illustrates an isometric view of an active phased array using helical antenna elements.

FIG. 4 illustrates an isometric view of an active phased array for a single beam including nineteen beamlets using helical radiating feed elements, according to an implementation. The active phased array 400 includes nineteen radiating feed elements 401 arranged in a triangular lattice, and may be configured to form a single beam. Advantageously, radiating feed element spacing may be electrically small (e.g., typically, 1.1λ). The radiating element may be chosen to provide maximum aperture efficiency in the regime where the element spacing is less than 2λ. Examples of radiating feed elements suitable for operation with the disclosed techniques may include end fire elements. For example a radiating element may be configured as a cupped helix, a Yagi or crossed Yagi antenna element, a log-periodic antenna element, or a stacked patch antenna element.

In an implementation illustrated in FIG. 4, the radiating feed element is configured as a cupped helix (helical) antenna. A helical antenna is an electromagnetic radiator made of a conducting wire wound in the form of a screw thread forming a helix. The pattern of a single turn determines polarization along the axis while the array determines the pattern shape. A circular cup around the feed point reduces the excitation of unwanted modes. In some implementations, the helix may be connected, at a feed point, to a center conductor of a coaxial transmission line. An outer conductor of the coaxial transmission line may be attached to a ground plane. The ground plane may take different forms. For example, in some implementations, the ground plane may be flat. In other implementations, the ground plane may be cupped in the form of a cylindrical cavity or in the form of a frustum cavity. Alternatively, or in addition to coaxial transmission lines, other types of feeds (such as waveguides and dielectric rods) are within the contemplation of the present disclosure.

In the end-fire, or axial, mode of operation, the helical radiating element has a single major lobe, the major lobe exhibiting a maximum radiation intensity along the axis of the helix. Minor lobes may be disposed at oblique angles to the axis.

In some implementations, the radiating feed element can be a Yagi (Yagi-Uda) or crossed Yagi antenna element that includes a number of linear dipole elements, one of which is energized directly by a feed transmission line, others of which act as parasitic radiators having currents induced by mutual coupling.

In some implementations, the radiating feed element may be a log-periodic antenna element. While similar to the Yagi-Uda array, in which only one element is directly energized by the feed line and the others operate in a parasitic mode, all the elements of the log-periodic array are coupled with a feed. In a log-periodic antenna, the antenna is fed at the small end of the structure. This produces an end-fire beam in the direction of the longer elements.

In some implementations, the radiating feed element may be a stacked microstrip patch antenna element. Microstrip antennas may include a very thin metallic strip (patch) placed a small fraction of a wavelength above a ground plane. The microstrip patch is designed so its pattern maximum is normal to the patch. This may be accomplished by appropriately choosing the mode (field configuration) of excitation beneath the patch. End-fire radiation can be accomplished by mode selection.

As indicated above, in some implementations, each radiating element is coupled with a respective amplifier module disposed proximate to the radiating element. Thus, the active phased array contemplated by the present disclosure includes a large number of small solid state amplifiers (SSPAs), one per feed element-polarization, which may be optimally located very near to the radiating elements in order to minimize line losses.

The power amplifier arrangements may be produced by SMT (surface mount technology) component placement systems, or pick-and-place machines, which are robotic machines used to place surface-mount devices (SMDs) onto a printed circuit board (PCB).

In an implementation, each radiating feed element may be associated with at least one gallium nitride (GaN) SSPA. GaN SSPAs represent an alternative technology to TWTAs in high throughput satellite architectures.

An active phased array including GaN SSPAs may be configured to produce hundreds of overlapping downlink user beams while obviating a need for travelling wave tube amplifiers, R-switches, output multiplexer filters and waveguide that might otherwise be required.

Each feed element may be communicatively coupled with a separate power amplifier for each respective polarization at which the feed element is intended to operate. As indicated above, the power amplifiers may, advantageously, be located very near to the feed elements in order to minimize line losses. As a result, output waveguides, that would be required in the absence of the present teachings, may be omitted from the forward path. As a result, the number of components, mass and complexity of a phased array are all reduced.

Advantageously, each power amplifier is fed by coaxial cable (rather than a waveguide) and configured such that, for example, an end-fire helical radiating antenna feed element plugs directly into the power amplifier.

In an implementation, one or more of the power amplifiers may be configured in a variant of the known Doherty configuration. A Doherty amplifier may provide high efficiency over an output backoff power range associated with the linearity profile required for bandwidth efficient modulation and coding waveforms. A Doherty amplifier may include relatively linear amplifiers, which are known to have lower efficiency at lower power levels. As a result, in modulation schemes that have high peak to average power ratio, a high efficiency is still obtained at back-off points. A Doherty amplifier may use one main power amplifier (PA) and one auxiliary PA. At maximum output power, both PAs contribute equally to the output. When decreasing the input drive level to, for example, half the maximum combined output power, the auxiliary PA may be configured to shut down.

Figure 5:
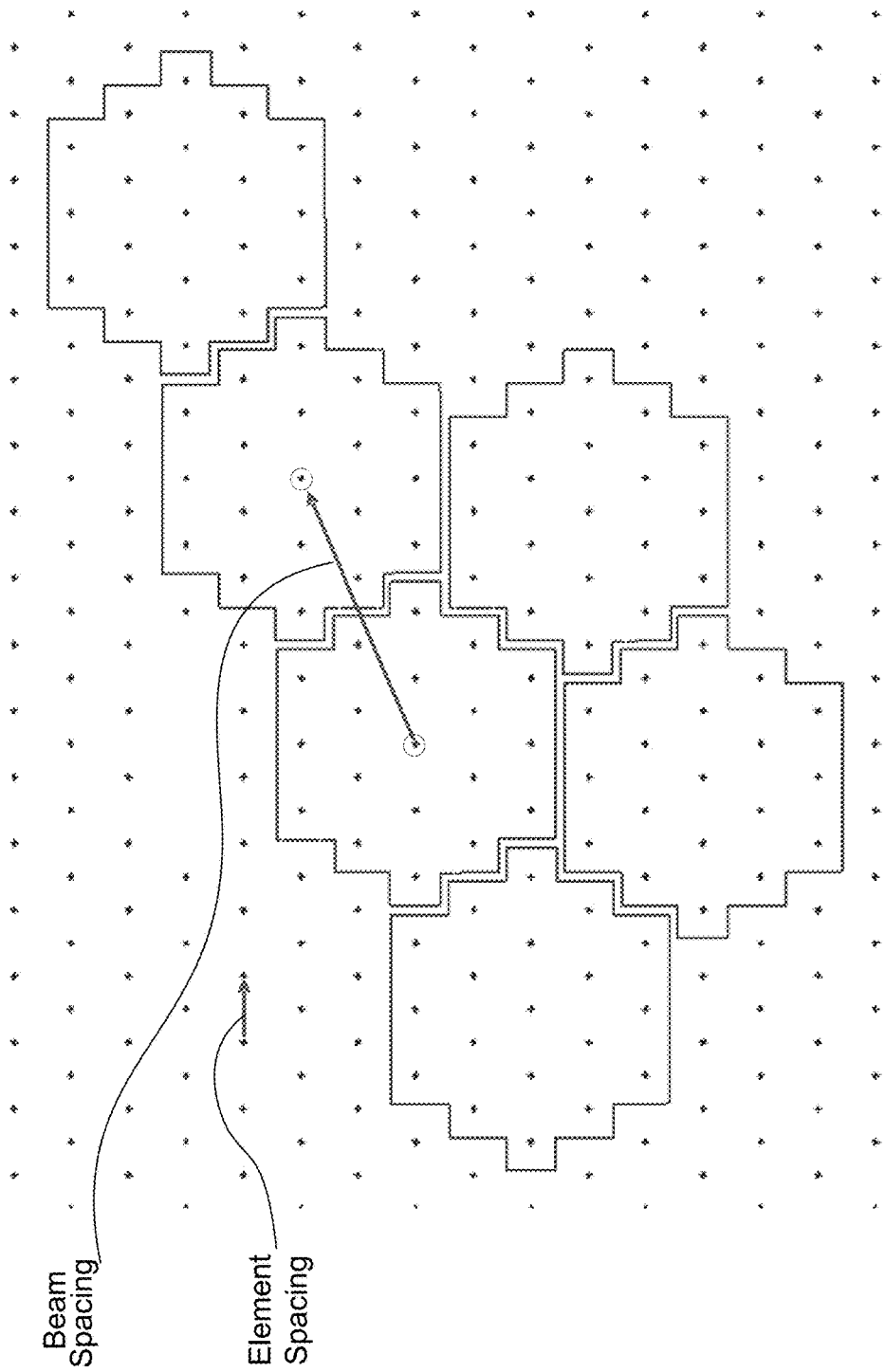
FIG. 5 illustrates an example of interleaving of a number of beams, each beam having nineteen radiating elements.

In an implementation, each radiating element illuminates a single large reflector to produce a very small beamlet in the reflector far-field. In the far-field, E- and H-field components are orthogonal to each other. The size of the beamlet is a function of the wavelength of the signal and the reflector diameter. For the nineteen element array illustrated in FIG. 4, nineteen beamlets may be combined to form a single beam. FIG. 5 illustrates an example of interleaving of a number of such beams, each beam having nineteen radiating elements.

In an example implementation, a 9 meter diameter reflector is contemplated that will produce a beamlet of about 0.1 degree in the 20 GHz band. Adjacent radiating elements will produce adjacent beamlets in the far-field at a spacing determined by the element spacing and the focal length of the reflector. In the example implementation, the beamlet spacing will be about 0.07 degrees. Because the beamlet spacing is less than the beamlet width, clusters of overlapping beamlets will efficiently combine in the far-field to produce an antenna pattern which is an image of the feed element cluster. Accordingly, the phased array may be referred to as an "imaging array" of which the beamlets may be regarded as pixels that produce the image.

For a given diameter of a reflector of an MBA system, a beam diameter and spacing may be determined for any particular desired operating frequency and antenna efficiency. An oversized reflector with respect to the chosen beam size may be used to increase antenna efficiency and beam isolation. Spacing between radiating feed elements in the radiating feed element array may be determined by the maximum size of the radiating feed element for efficient beam forming and the size of the electronics package that is able to fit behind the radiating feed elements.

The presently disclosed techniques improve multi beam antenna efficiency by as much as 70% a compared to conventional multi beam antennas. Because radiating feed elements are not shared between beams, beamforming circuitry is simplified to a small circuit card per beam. In some implementations, single carrier per beam operation is contemplated, which relaxes backoff requirements due to lower linearity requirements relative to multicarrier operation, and thus allows all amplifiers for a beam to be operated at maximum efficiency. In some implementations, multiple amplifiers per beam enable soft redundancy and eliminate a requirement for sparing and associated costs.

Improved antenna performance combined with low output losses has been found to reduce DC power to less than 50% of that required by conventional repeater output sections.

Multiple amplifiers per beam enables soft redundancy and eliminates a requirement for sparing and associated costs. In some implementations, there is sufficient beamlet overlap to enable soft redundancy for radiating feed element amplifiers. As used herein and in the claims, the term "soft redundancy" means that in the event that one of the amplifiers used to form the antenna beam fails, the beam shape may be reformed by re-optimizing the amplitude and phase coefficients to the remaining amplifiers. Soft redundancy may obviate a need to provide spare amplifiers.

Figure 6:
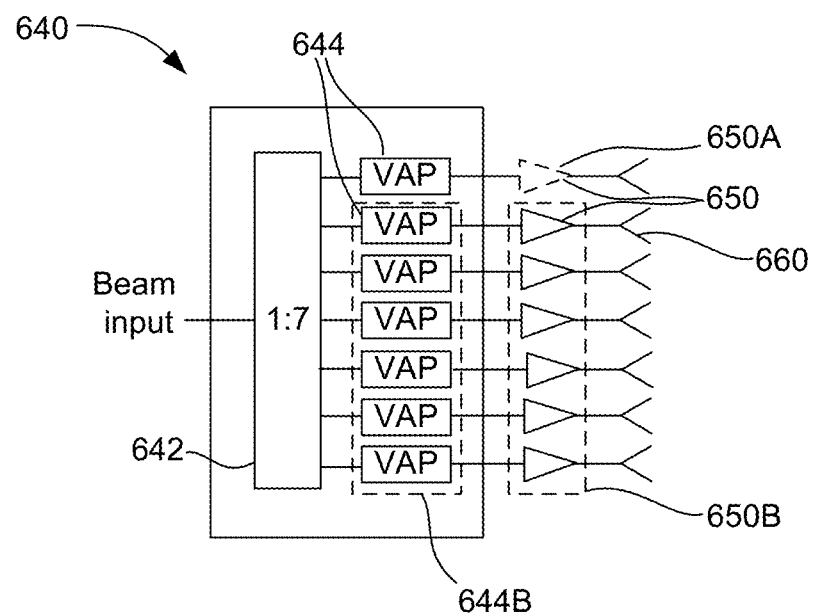
FIG. 6 illustrates an example implementation of soft redundancy for a seven element beamforming network.

FIG. 6 illustrates an example implementation of soft redundancy. The beam forming network (BFN) 640, in the illustrated implementation, is configured to perform seven element beam forming. The BFN 640 includes 1:7 power splitter 642, and commandable variable amplitude and phase (VAP) adjusting arrangements 644. In some implementations, one or more of the VAP adjusting arrangements 644 may be implemented as a monolithic microwave integrated circuit (MMIC) chip. Each of the seven VAP adjusting arrangements 644 is communicatively coupled with a single power amplifier 650, which is communicatively coupled with a single corresponding feed element 660. In an instance of a failure of amplifier 650A, for example, the beam shape may be reformed by re-optimizing the amplitude and phase coefficients for remaining VAP adjusting arrangements 644B corresponding to the remaining amplifiers 650B.

A still further advantage of the present teachings is that the gain-area product (GAP) of the MBA may be substantially improved with respect to conventional techniques, as will be demonstrated by reference to FIGS. 7-10.

Figure 7:
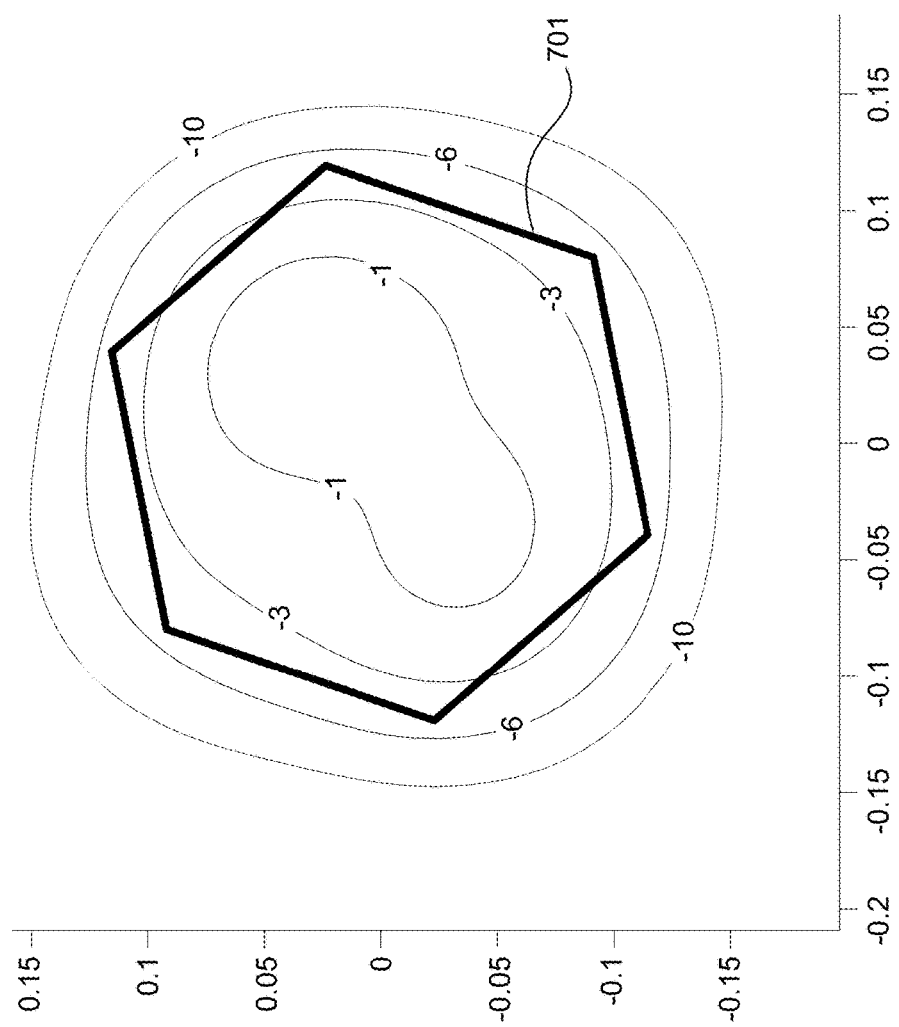
FIG. 7 illustrates a contour plot of MBA directivity with respect to peak directivity in accordance with an embodiment.

FIG. 7 illustrates a contour plot of MBA directivity with respect to peak directivity in accordance with an implementation. The illustrated plot depicts performance of a seven element spot beam and a 5 m diameter reflector. It may be observed that, in the illustrated example, a beam width in the far-field, represented by two opposing edges of the hexagonal polygon 701, is about 0.2°. The gain-area product for the illustrated implementation has been found to be about 14,500, corresponding to approximately 35% efficiency. The rolloff at the edge of the hexagonal polygon 701 is about 4-4.5 db. The 6 dB rolloff contour is approximately circular, denoting the effects of diffraction limits.

Figure 8:
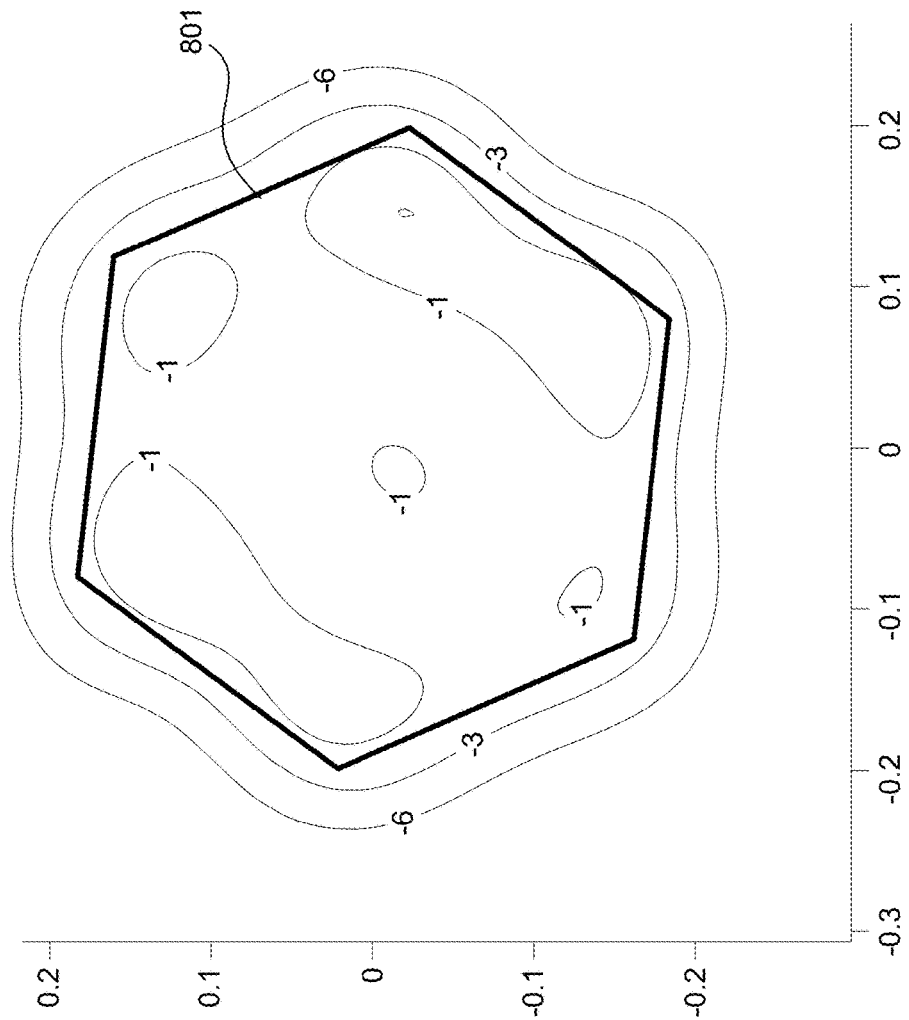
FIG. 8 illustrates a contour plot of MBA directivity with respect to peak directivity in accordance with another embodiment.

FIG. 8 illustrates a contour plot of MBA directivity with respect to peak directivity in accordance with another implementation. The illustrated plot depicts performance of a nineteen element spot beam and a reflector of about 9 meter diameter. It may be observed that the beam width in the far-field, represented by two opposing edges of the hexagonal polygon 801, is about 0.35°. The average directivity in the hexagonal polygon 801 is about 54 dB. The gain-area product for the illustrated implementation has been found to be over 25,000, corresponding to better than 61% efficiency. The rolloff at the edge of the hexagonal polygon 801 is about 1-2 db. In contrast to the contour plot for a seven element spot beam illustrated in FIG. 6, the 6 dB rolloff contour is approximately hexagonal, denoting more precise beam forming. It may be observed that, because of the above-mentioned steep roll-off, nearly adjacent coverage areas (not illustrated) may each be configured at an identical combination of frequency sub-band and polarization, with negligible mutual interference. Advantageously, the frequency reuse scheme may be employed while avoiding use of a signal encoding scheme.

Figure 9:
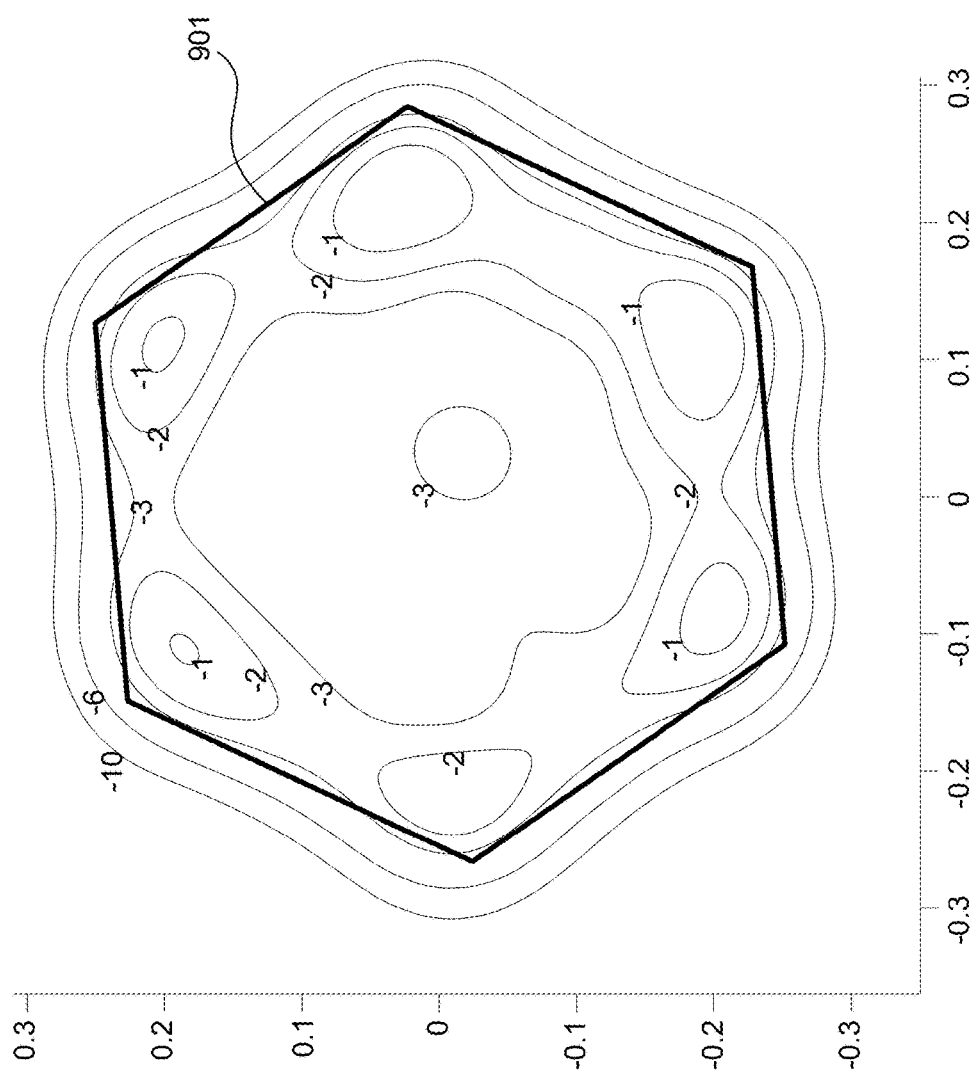
FIG. 9 illustrates a contour plot of MBA directivity with respect to peak directivity in accordance with a yet further embodiment.

FIG. 9 illustrates a contour plot of MBA directivity with respect to peak directivity in accordance with a yet further implementation. The illustrated plot depicts performance of a 37 element spot beam and a reflector of about 9 meter diameter. It may be observed that the beam width in the far-field, represented by two opposing vertices of the hexagonal polygon 901, is about 0.48°. The average directivity in the hexagonal polygon 901 is 51 dBi. The gain-area product is about 24,000, corresponding to better than 58% efficiency. The rolloff at the edge of the hexagonal polygon 901 is about 4 db. Again, in contrast to the contour plot for the seven element spot beam illustrated in FIG. 6, the 6 dB rolloff contour is approximately hexagonal.

Figure 10:
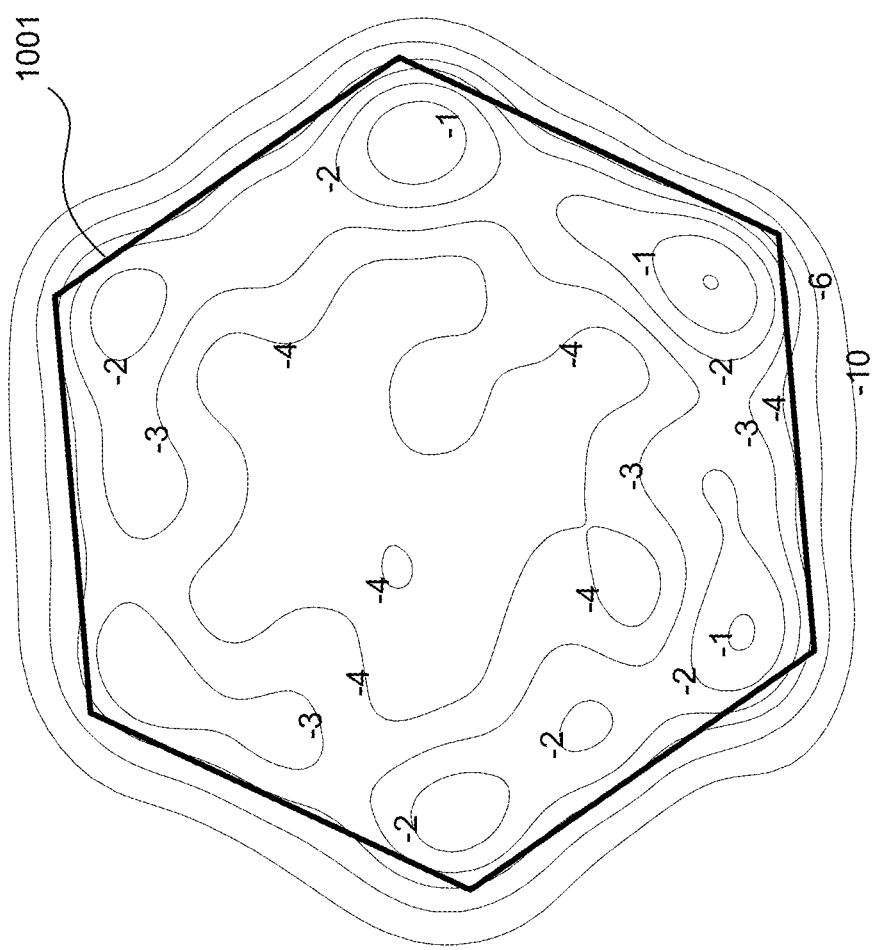
FIG. 10 illustrates a contour plot of MBA directivity with respect to peak directivity in accordance with a further embodiment.

Referring to FIG. 10 a contour plot of MBA directivity with respect to boresight peak directivity for a 37 helix element spot beam coverage area is illustrated. The contour plot assumes a reflector of about 3 meter diameter. The beam spacing in the far-field represented by two opposing edges of the hexagonal polygon 1001 is about 0.9°. The rolloff at the edge of the hexagonal polygon 1001 is about 4 db. Again, in contrast to the 7 element configuration in FIG. 6, the 6 dB rolloff contour is approximately hexagonal. An MBA system configured to form approximately 300 such beams can provide, full earth coverage.

Thus, an imaging array fed reflector for a high throughput satellite payload has been described.

The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A multi-beam antenna (MBA) system for a spacecraft, the MBA system comprising:
   a reflector; and
   a plurality of radiating feed elements, configured as a phased array, illuminating the reflector, operable at a frequency having a characteristic wavelength ($\lambda$), and configured to produce, in a far field at the reflector, a set of contiguous abutting beams; wherein: the frequency is at least 20 GHz, and $\lambda$ is no greater than 15 mm and no smaller than 7.5 mm;
   each radiating feed element is coupled with and proximate to a respective amplifier module and is associated with a respective beamlet;
   the radiating feed elements and amplifier modules are disposed in a closely packed triangular lattice such that separation between adjacent radiating feed elements is not greater than $2\lambda$;
   each respective beamlet has a beamlet width, the beamlet being a function of $\lambda$ and a beamlet spacing in the far field; and
   the beamlet width is approximately 0.1 degree when $\lambda$ is 15 mm and the beamlet spacing is less than the beamlet width.

2. The MBA system of claim 1, wherein each of the radiating feed elements is associated with only one of the contiguous abutting beams.

3. The MBA system of claim 1, wherein each beam is formed from a plurality of associated beamlets and each radiating feed element is associated with a single one of the plurality of associated beamlets.

4. The MBA system of claim 1, wherein the respective coupling is a coaxial connection.

5. The MBA system of claim 1, wherein the at least one respective amplifier includes a first amplifier and a second amplifier, each amplifier corresponding to orthogonal polarizations.

6. The MBA system of claim 1, wherein the reflector is approximately 9 meters in diameter, and the beamlet width is approximately 0.1 degrees in a 20 GHz band.

7. The MBA system of claim 1, wherein the beamlet spacing is approximately 0.07 degrees.

8. The MBA system of claim 1, wherein, for each beam in the set of contiguous abutting beams, a single carrier is operated.

9. The MBA system of claim 1, wherein for each beam in the set of contiguous abutting beams, a set of amplifiers is configured to provide soft redundancy.

10. The MBA system of claim 1, wherein each radiating feed element includes an end-fired element.

11. The MBA system of claim 10, wherein the end-fired element is configured as a helical, Yagi, crossed Yagi, log periodic, or a stacked patch antenna element.

12. The MBA system of claim 1, wherein the at least one respective amplifier includes at least one main amplifier and at least one auxiliary amplifier.

13. The MBA system of claim 12, wherein the at least one main amplifier and at least one auxiliary amplifier are arranged in a Doherty configuration.

14. A spacecraft comprising a communications payload subsystem, the payload subsystem including:
   a reflector; and
   a plurality of radiating feed elements, configured as a phased array, illuminating the reflector, operable at a frequency having a characteristic wavelength ($\lambda$), and configured to produce, in a far field at the reflector, a set of contiguous abutting beams; and wherein:
the frequency is at least 20 GHz, and $\lambda$ is no greater than 15 mm and no smaller than 7.5 mm:
the radiating feed element is coupled with and proximate to a respective amplifier module and is associated with a respective beamlet;
the radiating feed elements and amplifier modules are disposed in a closely packed triangular lattice such that separation between adjacent radiating feed elements is not greater than $2\lambda$;
each respective beamlet has a beamlet width, the beamlet being a function of $\lambda$ and a beamlet spacing in the far field; and
the beamlet width is approximately 0.1 degree when $\lambda$ is 15 mm and the beamlet spacing is less than the beamlet width.

15. The spacecraft of claim 14, wherein each of the radiating feed elements is associated with only one of the contiguous abutting beams.

16. The spacecraft of claim 14, wherein each beam is formed from a plurality of associated beamlets and each radiating feed element is associated with a single one of the plurality of associated beamlets.

17. The spacecraft of claim 14, wherein the at least one respective amplifier includes a first amplifier and a second amplifier, each amplifier corresponding to orthogonal polarizations.

18. The spacecraft system of claim 14, wherein the at least one respective amplifier includes at least one main amplifier and at least one auxiliary amplifier.

* * * * *